(12) United States Patent
Collins (10) Patent No.: US 11,071,929 B2
(45) Date of Patent: Jul. 27, 2021

(54) GAS-WATER SEPARATION SYSTEM AND METHODS

(71) Applicant: INGERSOLL-RAND INDUSTRIAL U.S., INC., Davidson, NC (US)

(72) Inventor: James Christopher Collins, Moorseville, NC (US)

(73) Assignee: INGERSOLL-RAND INDUSTRIAL U.S., INC., Davidson, NC (US)

( * ) Notice: Subject to any disclaimer, the term of this patent is extended or adjusted under 35 U.S.C. 154(b) by 321 days.

(21) Appl. No.: 16/012,299

(22) Filed: Jun. 19, 2018

(65) Prior Publication Data

US 2019/0381423 A1 Dec. 19, 2019

(51) Int. Cl.
*B01D 17/02* (2006.01)
*B01D 53/26* (2006.01)
(Continued)

(52) U.S. Cl.
CPC ....... *B01D 17/0217* (2013.01); *B01D 5/0084* (2013.01); *B01D 53/266* (2013.01);
(Continued)

(58) Field of Classification Search
CPC .. B01D 17/0217; B01D 45/16; B01D 53/002; B01D 53/265; B01D 53/266;
(Continued)

(56) References Cited

U.S. PATENT DOCUMENTS

| 2,569,909 A | 10/1951 | Umney |
| 2,954,841 A | 10/1960 | Reistle, Jr. |

(Continued)

FOREIGN PATENT DOCUMENTS

| DE | 3536673 A1 | 4/1987 |
| EP | 0120547 A1 | 10/1984 |

(Continued)

OTHER PUBLICATIONS

European Patent Office, Extended European Search Report in corresponding application No. 19179893.3, dated Nov. 19, 2019, 9 pp.

(Continued)

*Primary Examiner* — Cabrena Holecek
(74) *Attorney, Agent, or Firm* — Kevin E. West; Advent, LLP (57) ABSTRACT

A gas-water separation system may be used for removing water from a wet gas compressed in a water-injected contact-cooled gas compressor. The gas-water separation system may include a tank constructed to hold a quantity of water; a heat exchanger coupled to the tank and constructed to extract heat from the water to chill the water when the water is present within the tank; an inlet port constructed to inject a flow of the wet gas into the chilled water when the water is present within the tank, the chilled water being operative to condense water vapor from the wet gas and reduce the dew point of the wet gas to yield a chilled compressed gas; a biological control system constructed to suppress biological activity in the tank; and a discharge port operative to discharge the chilled compressed gas.

6 Claims, 5 Drawing Sheets

(51) Int. Cl.
    *B01D 5/00*     (2006.01)
    *B04B 5/00*     (2006.01)
    *B01D 53/00*     (2006.01)

(52) U.S. Cl.
    CPC ............ *B04B 5/005* (2013.01); *B01D 5/0015* (2013.01); *B01D 53/002* (2013.01)

(58) Field of Classification Search
    CPC .... B01D 5/0015; B01D 5/0084; B04B 5/005; C02F 1/32; C02F 1/50; C02F 2303/04; F04B 39/16
    See application file for complete search history.

(56) References Cited

U.S. PATENT DOCUMENTS

| | | |
|---|---|---|
| 3,722,187 A | 3/1973 | Potter et al. |
| 3,945,464 A | 3/1976 | Sato |
| 4,492,631 A | 1/1985 | Martin |
| 7,275,737 B2 | 10/2007 | Heirman |
| 2013/0000341 A1 | 1/2013 | De Piero et al. |
| 2016/0096753 A1* | 4/2016 | Kakadjian ................ C02F 1/683 210/747.9 |
| 2017/0074528 A1 | 3/2017 | De Piero et al. |
| 2017/0274319 A1* | 9/2017 | Wang ................. B01D 53/1475 |

FOREIGN PATENT DOCUMENTS

| | | | |
|---|---|---|---|
| FR | 2495492 A1 * | 6/1982 | ........... B01D 53/265 |
| FR | 2495492 A1 | 6/1982 | |

OTHER PUBLICATIONS

Atlas Copco Stationary Air Compressors Instruction Book, AQ30-37-45-55 and AQ55 VSD, 2003, 58 pages.

* cited by examiner

GAS-WATER SEPARATION SYSTEM AND METHODS

TECHNICAL FIELD

The present application relates generally to compressors and more particularly, but not exclusively, systems and methods for performing gas-water separation on a compressed wet gas discharged by a compressor.

BACKGROUND

Gas-water separation systems remain an area of interest. Some existing systems have various shortcomings, drawbacks and disadvantages relative to certain applications. For example, some gas-water separation system configurations may be reduced in complexity, e.g., eliminating the need for a pump and/or may be improved by eliminating the need for the frequent addition of water to a water injected contact-cooled gas compressor system. Accordingly, there remains a need for further contributions in this area of technology.

SUMMARY

One embodiment of the present invention is a unique gas-water separation system. Another embodiment is another unique gas-water separation system. Another embodiment is a unique method for performing water-gas separation. Other embodiments include apparatuses, systems, devices, hardware, methods, and combinations for gas-water separation. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Gas compressors generate heat during the compression process. Removing this heat during the compression process reduces the amount of energy required to compress the gas volume. One method of removing this heat is by introducing a liquid that can absorb the heat of compression. Typically this liquid is an oil or another liquid with suitable lubricating and heat absorbing characteristics. However, for environmentally friendly alternatives, water has become a more recent substitute in serving the function of heat removal within the compression cell. This requires careful control of the gas and water mixture to maintain gas quality, water quality and water recovery.

Some aspects of some embodiments of the present invention include gas-water conditioning and control of a water injected compressor performed largely within a multi-functional tank that is constructed to perform multiple functions, e.g., water cooling, gas cooling, gas drying, biological sterilization, gas-water separation, recycling of generated condensed water from the gas stream, and pressurized water storage & supply. In various embodiments, the gas may be any gas and/or may be air. Some embodiments integrate many of the sub-system functions of a water injected compressor, into a more compact, multi-functional tank that creates greater gas-water separation efficiency, heat transfer (cooling) efficiency, biological controls (e.g., sterilization), elimination of a water pump & complex bypassing, and reduction of interconnecting piping. Additionally, the generation of condensed water in the gas cooling process improves gas quality (e.g., reduced pressure dew point) and recovers the condensed water to reduce or eliminate the need for periodic addition of water to the system.

Figure 1:
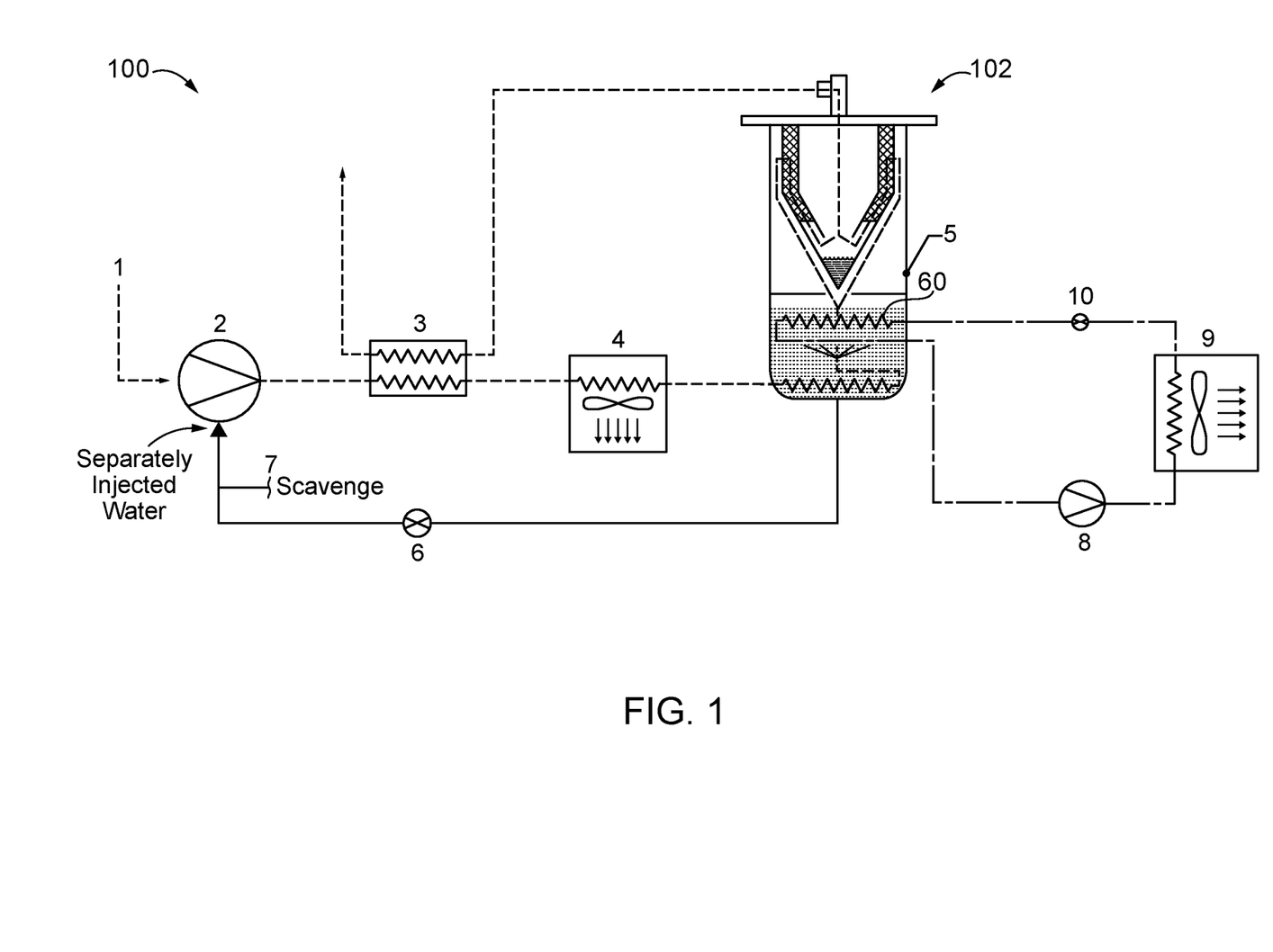
FIG. 1 schematically illustrates some aspects of a non-limiting example of a compressor system in accordance with an embodiment of the present invention.

Referring to FIG. 1, some aspects of a non-limiting example of a compressor system 100 in accordance with an embodiment of the present invention is schematically illustrated. Compressor system 100 includes a compressor 2 constructed to compress an inlet gas 1. In one form, compressor 2 is a rotary screw compressor. In a particular form, compressor 2 is a water injected contact-cooled gas compressor. In other embodiments, compressor 2 may take one or more other forms.

Compressor system 100 includes a gas-water separation system 102 for removing water from a wet gas compressed in compressor 2. In some embodiments, the wet gas, i.e., warm compressed gas containing water vapor and/or liquid water, enters a multi-functional tank 5, which is constructed to hold a quantity of water. In particular, the wet gas enters a tank into a chilled volume of water. A heat exchanger 60 is employed, e.g., contained within the tank 5, to cool the water volume within the tank, preferably by a vapor compression refrigeration cycle, although other types of cooling systems may additionally or alternatively be employed. The compressed wet gas flow permeates through the water volume, cooling the gas to a desired temperature, further creating condensed water from the water vapor in the wet gas. Buoyancy of the gas causes it to rise through the water volume, entering a centrifugal chamber. The chamber geometry is designed to produce a swirling effect of the fluid flow causing centrifugal forces to separate denser liquids to the exterior surface. The swirling fluid enters a vertical annulus containing multiple exterior and interior holes, where the majority of the liquid becomes separated from the fluid stream, recycling the liquid to the chilled water volume, and allowing the mostly gas flow to exit separately for downstream processing and use.

In the embodiment of FIG. 1, a significant portion, e.g., most, of the gas-water separation process functions occur within the central tank 5. Inlet gas 1 enters the compressor 2 with separately injected water. The fluid mixture pressure is increased in compressor 2 and discharged into a recuperator 3, where the hot compressor gas is cooled and cold saturated compressed gas received from tank 5 is reheated to reduce its relative humidity. The cooled compressed gas proceeds to an additional cooler 4, and is cooled by a separate fluid media, e.g., ambient air, although other cooling fluids may be used. The gas stream is cooled significantly and under at least some conditions, water is condensed from the gas stream producing a gas-liquid mixture.

The pressurized stream then enters the multi-functional tank 5 as a wet gas, where the fluids are conditioned and controlled in a manner described below. The conditioned gas stream exits the multi-functional tank 5, proceeding to the recuperator 3 as previously described, where it exits the system for use by a downstream or customer process. Additionally at the multi-functional tank 5, conditioned water exits the tank in two separate flow streams: the primary stream is received by the water control valve 6; and the secondary stream exits the tank as scavenge water, e.g., from a scavenge tube described below, and re-enters downstream of control valve 6 at a desired location 7 for injection into compressor 2, e.g., re-enters at a location upstream of where the water is injected into compressor 2. Furthermore the water in the multi-functional tank 5 may be directly cooled by a cooling system, for example but not limited to, a vapor compression refrigeration system. In other embodiments, other cooling schemes may be employed, e.g., Peltier thermoelectric cooling, externally chilled water, and/or other cooling streams.

Refrigeration fluid exits the tank 5 and enters a refrigeration compressor 8. The pressurized refrigerant enters a condensing heat exchanger 9, depicted as an air cooled device but should not be limited as such. High pressure liquid refrigerant enters an expansion device 10, e.g., an expansion valve or a capillary tube, where the gas pressure reduces, resulting in a cold fluid entering a heat exchanger 60, e.g., an evaporative heat exchanger, inside of the tank 5, allowing the volume of water inside of tank 5, e.g., the lower portion of tank 5, to be kept at a desired temperature.

Figure 2:
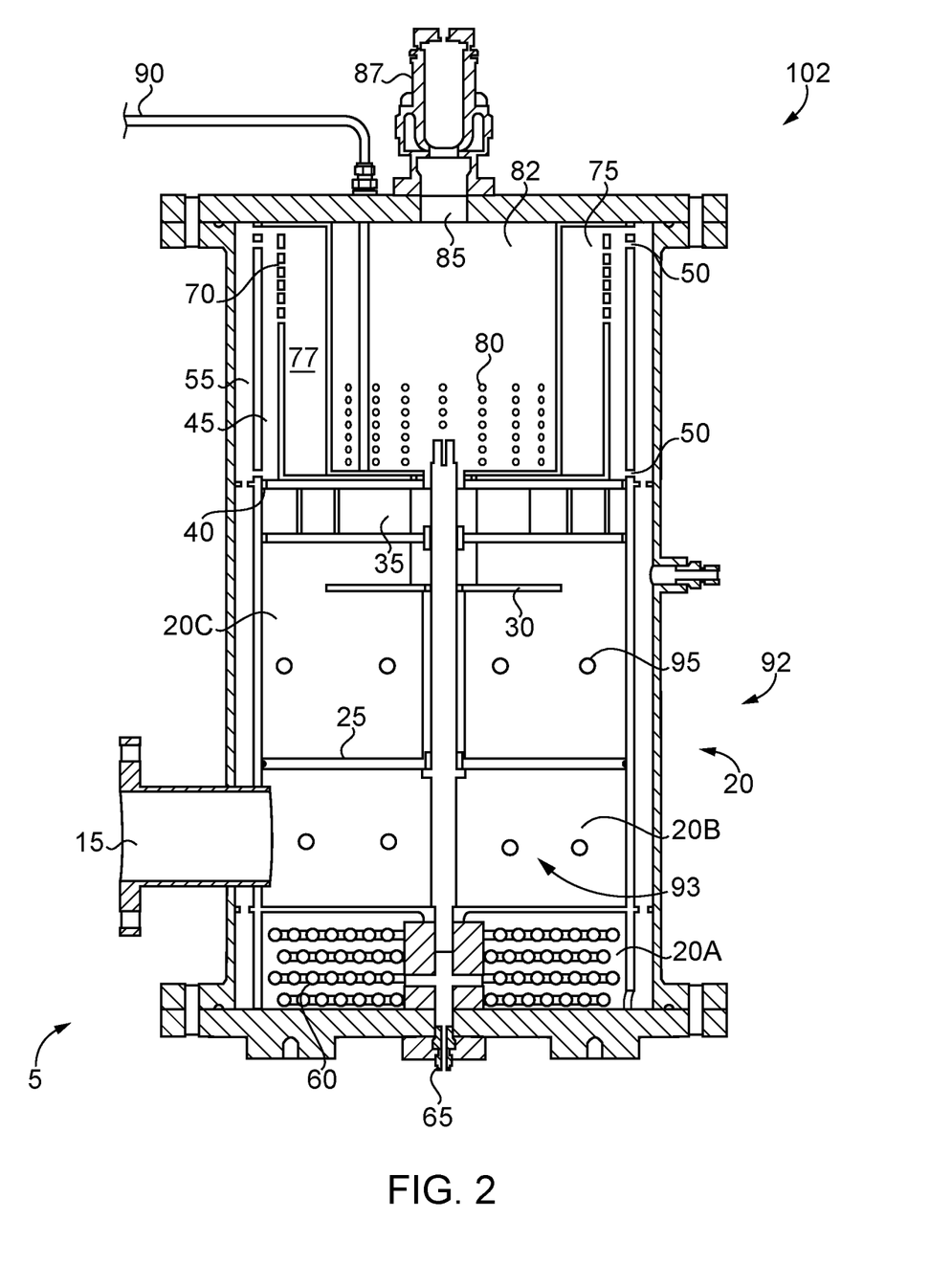
FIG. 2 is a cross-section illustrating some aspects of a non-limiting example of a multi-functional tank in accordance with an embodiment of the present invention.

FIG. 2 is a cross-sectional view illustrating some aspects of a non-limiting example of the gas-water separation system 102, including the multi-functional tank 5, and its operation. Tank 5 is constructed to hold a quantity of water. Wet gas enters the tank 5 via an inlet port 15. The lower half of the tank is a volume 20 filled with chilled water that is kept at a desired temperature by the cooling coil or heat exchanger 60 or other similar device disposed in volume 20A. Volume 20 is formed of volumes 20A, 20B and 20C of tank 5 containing the chilled water. The top of the chilled water level is in volume 20C, disposed between the dispersion plate 25 and the obstruction plate 30 described below.

Heat exchanger 60 is coupled to tank 5. In some embodiments, heat exchanger 60 is disposed inside tank 5. Heat exchanger 60 is constructed to extract heat from the water to chill the water in tank 5 to the desired temperature. In some embodiments, heat exchanger 60 is constructed to flow a chilled fluid therethrough to extract the heat from the water to chill the water. The heat exchanger may be constructed to seal the chilled fluid from the water. In other embodiments, other cooling schemes may be employed, e.g., as mentioned above.

The inlet port 15 is constructed to inject the wet gas into the chilled water present in tank 5. The chilled water is operative to condense water vapor from the wet gas and reduce the dew point of the wet gas to yield a chilled wet gas and water from the condensed vapor. The wet gas introduced at inlet port 15 enters at a sufficient velocity to cause it to disperse horizontally, while buoyancy causes it to rise vertically through the chilled water volume 20B.

The gas-water separation system 102 includes a dispersion plate 25 disposed in the tank 5. The flow of the wet gas generates bubbles in the chilled water upstream of dispersion plate 25. The tank includes the volume 20B containing chilled water. The volume 20B is disposed between the dispersion plate 25 and the inlet port 15, and is sized to allow the formation of the bubbles in the chilled water in volume 20B from the flow of wet gas received from inlet port 15 as the gas rises through the chilled water in volume 20B. The water is chilled by the heat exchanger 60 in volume 20A.

Figure 3:
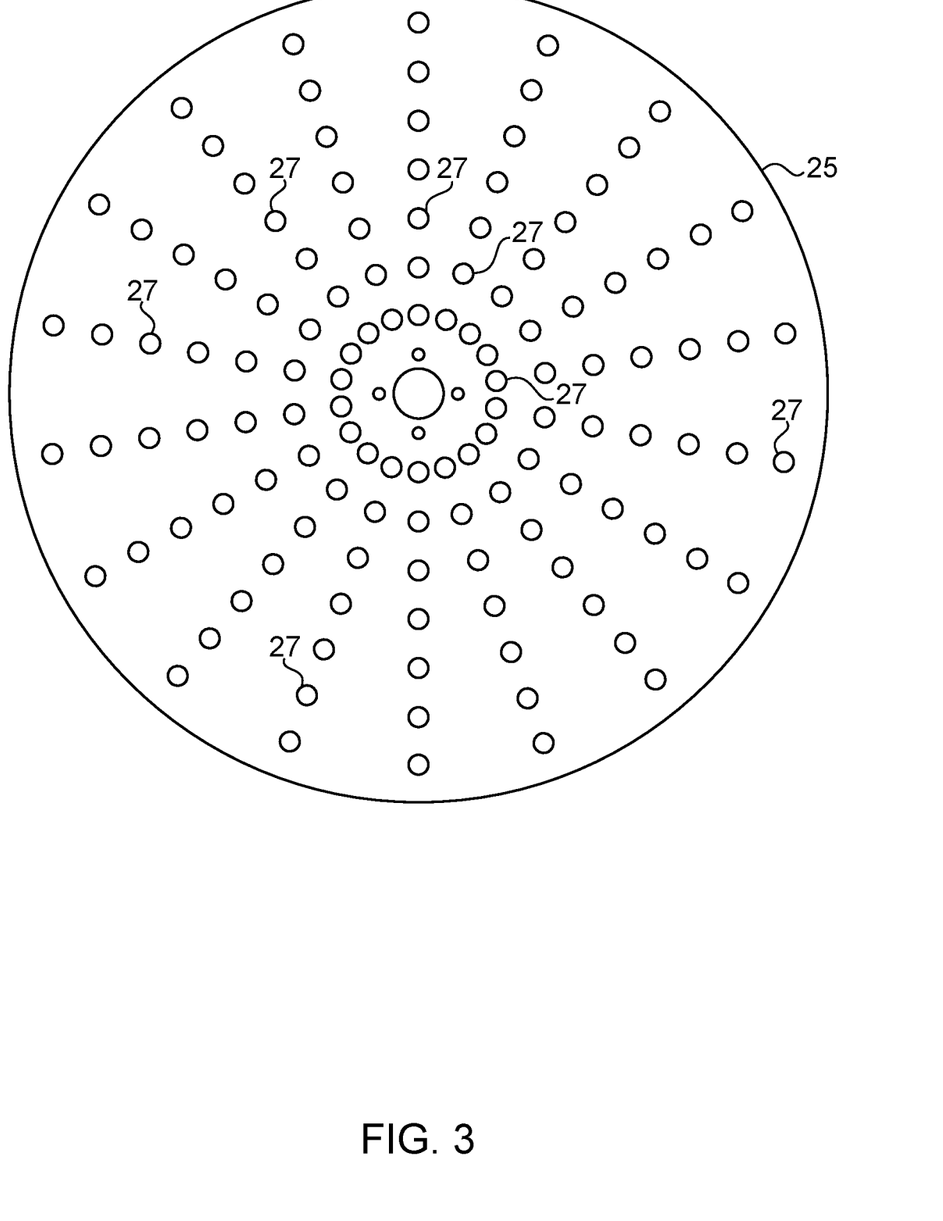
FIG. 3 illustrates some aspects of a non-limiting example of a dispersion plate in accordance with an embodiment of the present invention.

The vertical progression of the gas, e.g., the bubbles, engages dispersion plate 25 which can be, for example, a plate having a pattern of holes 27 (FIG. 3) or other geometric features that cause the initial larger gas bubbles to be reduced in size, and to disperse the resultant smaller bubbles into the chilled water above dispersion plate 25. The size and patterns of holes 27 may be varied in accordance with the needs of the particular application, e.g., to strike a desired balance between pressure drop and flow rate and/or other design considerations. The size reduction of the gas bubbles provides increased surface area contact with the chilled water volume 20C, thus improving heat transfer, gas cooling and final generation of condensed water from the wet gas. The generated condensed water functions to replenish water lost downstream of the tank exit or discharge port 85. The gas continues to rise. Its flow path is obstructed by an obstruction plate 30. Gas-water separation system 102 includes, e.g., disposed within tank 5 in some embodiments, a centrifugal chamber or centrifuge 35 disposed downstream of dispersion plate 25 and downstream of obstruction plate 30. Centrifuge 35 is constructed to separate water, i.e., liquid water, from the wet gas. Obstruction plate 30 is constructed to obstruct water and reduce the amount of water entering centrifuge 35. For example, obstruction plate 30 controls the flow of the gas-water mixture in such a way to discourage large masses of liquid water from entering centrifuge 35.

Figure 4:
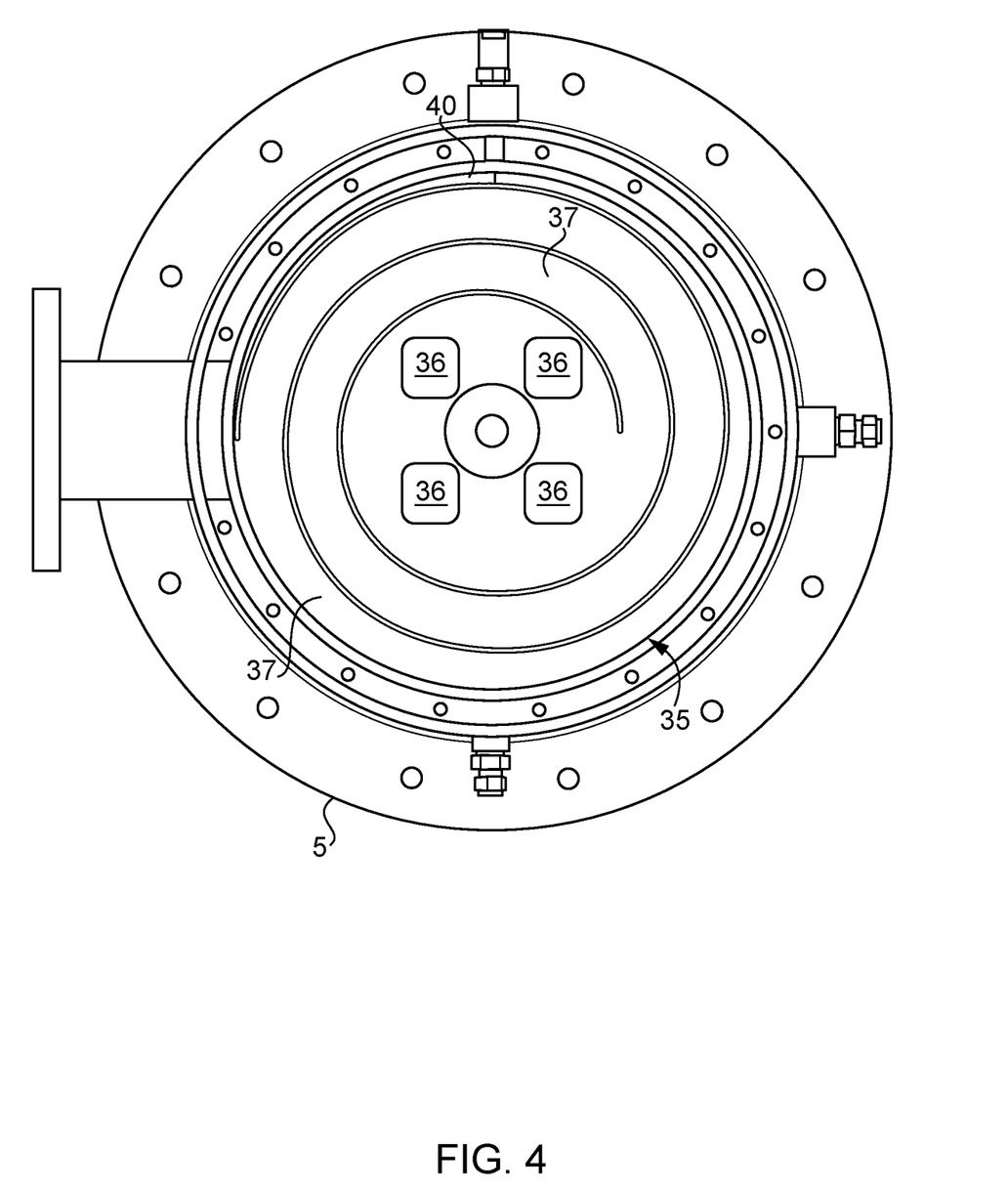
FIG. 4 illustrates some aspects of a non-limiting example of a centrifuge in accordance with an embodiment of the present invention.

The geometry of the centrifuge 35 may take many forms. In one non-limiting example, centrifuge 35 includes a scroll shaped flow path. For example, as illustrated in FIG. 4, chilled wet gas enters centrifuge 35 through centrifuge inlet ports 36. Centrifuge 35 includes a scroll-shaped flowpath 37 constructed to separate the water received in centrifuge inlet ports 36 from the chilled wet gas. The wet gas exits centrifuge 35 through a centrifugal exit port 40.

Referring again to FIG. 2, the gas-water mixture proceeds beyond the water level of the tank 5 and is now driven by pressure differential of the system. The flow velocity increases in the centrifuge 35, with the wet gas moving from the center of the tank 5 toward the outer portion of the centrifuge 35 where it exits through centrifugal exit port 40. The gas-water flow continues vertically while rotating around the central axis of the tank 5 in an annulus region 45. At the upper and lower exterior diameter of the annulus 45, drain holes 50 are located, allowing the majority of the separated water to flow into annulus 55 where it may flow downward back into the bottom of the tank and chiller section or volume 20A.

From this section (volume 20A) chilled water also exits via a chilled water discharge port 65 for use as cold injected water into the compressor 2. At the upper interior diameter of annulus 45, a pattern of holes 70 are located allowing what is now mostly gas flow to enter into annulus section 75, which is in fluid communication with centrifuge 35 by virtue of the holes 70. In some embodiments, annulus section 75 may form a coalescing filter constructed to coalesce small water droplets into larger masses of water. For example, annulus section 75 may be filled with porous media 77 (e.g., stainless steel wire mesh, borosilicate micro-fiber, or other porous media) serving the purpose of allowing small water droplets to coalesce into larger, heavier water masses. The wet gas flow proceeds downward through annulus section 75 and the porous media 77, and exits through small holes 80, where the majority of the water resides at the bottom of a retarding chamber 82. The retarding chamber 82 is constructed to significantly reduce flow velocity, resulting in the chilled compressed gas rising through the chamber essentially free of liquid water, and exiting tank 5 through discharge port 85, and in some embodiments, a check valve 87 in fluid communication with discharge port 85. In some embodiments, check valve 87 may be considered a part of discharge port 85.

Figure 5:
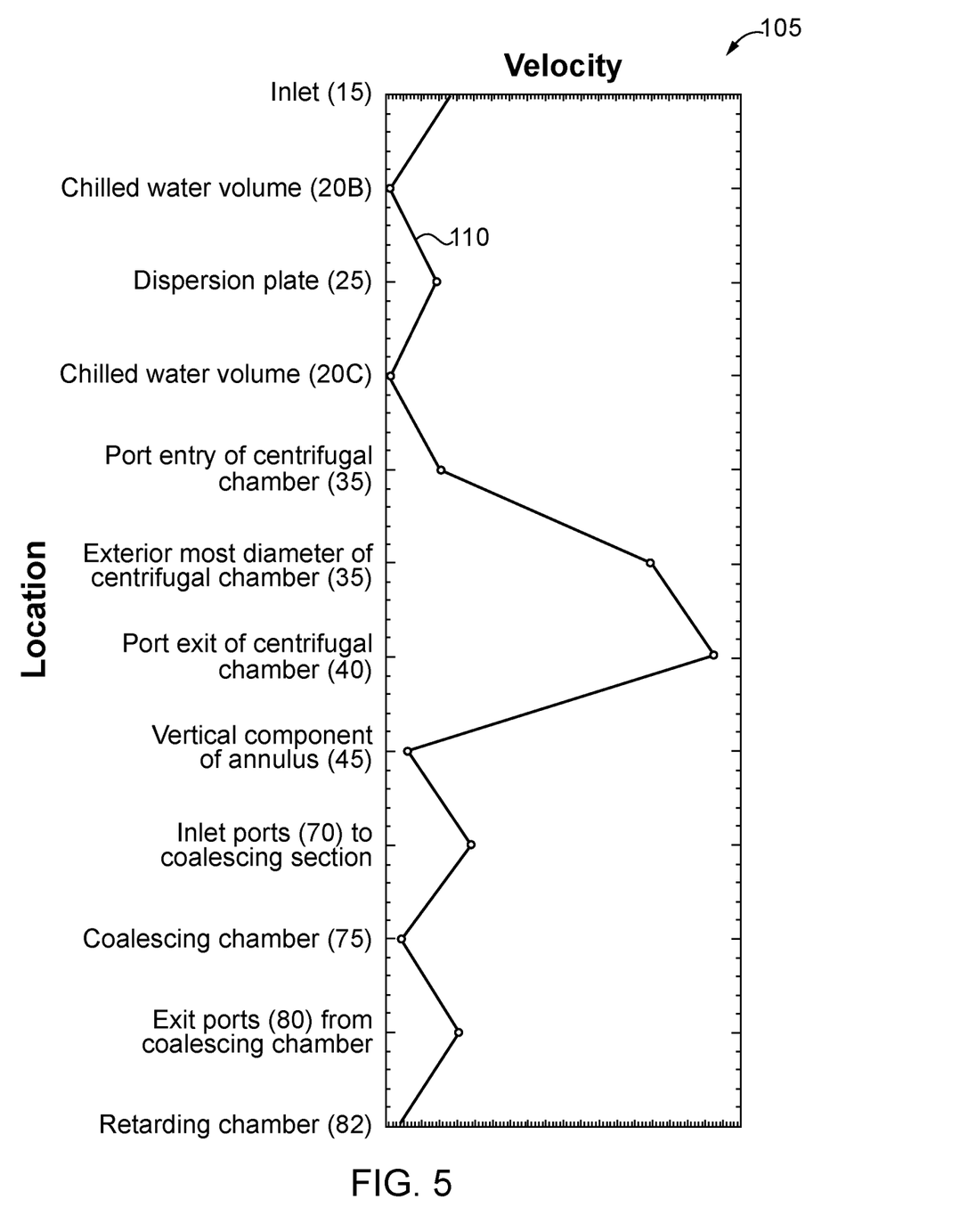
FIG. 5 is a plot illustrating estimated relative velocities of a wet gas proceeding through a multi-functional tank in accordance with an embodiment of the present invention.

Referring to FIG. 5, a plot 105 illustrates the relative velocity 110 of the wet gas flow at various locations throughout tank 5. The velocities of the wet gas flow are controlled in and throughout the tank 5 in such a way to allow for the gas and water to separate, as each respective density is very different. The gas, having a lower density, allows its momentum to change its vector much more easily than the more dense water. Centrifugal forces push the more dense water toward the exterior surfaces, while the less dense gas remains predominately inward of the rotation. Reducing the velocity of the gas-water flow in the retarding chamber 82 and changing its vector upward, allows pressure to drive the gas out of the top of the tank while the more dense water rests at the bottom of the chamber with insufficient energy to allow it to rise. Scavenge tube 90 rests its entry point near the floor of the chamber with minimal inlet area geometry available to all fluids. Downstream of the scavenge tube 90 entrance may be a valve that is controlled such that as water level increases in the chamber above the scavenge entry opening, the valve may be opened periodically allowing the water level to be removed. Downstream of the valve, the scavenge line connects to a lower pressure section as illustrated in FIG. 1 at location 7 and described previously. FIG. 5 illustrates estimates of relative general flow velocities, e.g., calculated relative flow velocities of the wet gas or gas-water mixture as it progresses through the tank 5 geometry.

Referring again to FIG. 2, gas-water separation system 102 includes a biological control system 92 constructed to suppress biological activity in the tank 5, e.g., biological activity on the structures and components or features of tank 5 and/or the water in tank 5. For example, in some embodiments, biological control system 92 may be constructed to provide biological control and sterilization and/or discourage biological activity or growth. Biological control system 92 may be disposed at one or more of various locations, e.g., including locations 93 illustrated in FIG. 2. In some embodiments, biological control system 92 includes a biocide and/or a UV light source. Biological control may be performed using one or more of various techniques (e.g., chlorinated injection or the use of other biocides, for example, silver flashing or plating of one or more components of tank 5, reverse osmosis filtration and/or other techniques). In the embodiment of FIG. 2, ultraviolet lights 95 are employed, e.g., UV lights having an output with wavelengths in the range of 200 nanometers to 280 nanometers (UVC). In some embodiments, it is envisioned that these UVC lights will be of the light emitting diode type (LED). In some embodiments, the UVC lights and/or other UV emitters may be mounted on one or more rods extending within tank 5. In some embodiments, the cooling system for chilling the water in tank 5 via heat exchanger 60 may be cycled on and off in order to set up or improve convection and/or to aid in biological control.

Additionally referring to FIGS. 1 and 2, some embodiments of the present invention do not require the use of a water pump or complex bypass piping, as the system is constructed to maintain some level of positive pressure on the tank 5 to allow water to be supplied to the compressor 2 at any time. This requires certain controls to be employed, which may include, for example, one or more valves to isolate the tank from atmospheric pressure.

Embodiments of the present invention include a gas-water separation system for removing water from a compressed wet gas discharged by a compressor, comprising: a tank constructed to hold a quantity of water; a heat exchanger coupled to the tank and constructed to extract heat from the water to chill the water when the water is present within the tank; an inlet port constructed to inject a flow of the wet gas into the chilled water when the chilled water is present within the tank, the chilled water being operative to condense water vapor from the wet gas and reduce the dew point of the wet gas to yield a chilled compressed gas; a biological control system constructed to suppress biological activity in the tank; and a discharge port operative to discharge the chilled compressed gas.

In a refinement, the heat exchanger is constructed to flow a chilled fluid therethrough to extract the heat from the water.

In another refinement, the heat exchanger is constructed to seal the chilled fluid from the water.

In yet another refinement, the flow of the wet gas generates large bubbles in the chilled water, further comprising a dispersion plate disposed in the tank, and constructed to reduce the size of the bubbles to smaller bubbles and disperse the smaller bubbles in the chilled water.

In still another refinement, a volume of the tank disposed between the dispersion plate and the inlet port is sized to allow the formation of the larger bubbles.

In yet still another refinement, the gas-water separation system further comprises a centrifuge constructed to separate the water from the wet gas.

In a further refinement, the gas-water separation system further comprises an obstruction plate constructed to reduce an amount of the water entering the centrifuge.

In a yet further refinement, the gas-water separation system further comprises a check valve in fluid communication with the discharge port.

In a still further refinement, the biological control system includes a biocide and/or a UV light source.

Embodiments of the present invention include a gas-water separation system for removing water from a compressed wet gas discharged by a compressor, comprising: a tank constructed to hold a quantity of water; a heat exchanger coupled to the tank and constructed to extract heat from the water to chill the water when the water is present within the tank; an inlet port constructed to inject a flow of the wet gas into the chilled water when the chilled water is present within the tank; a dispersion plate disposed in the tank, the tank including a volume disposed between the dispersion plate and the inlet port being, the volume being sized to allow the formation of larger bubbles from the flow of the wet gas received from the inlet port, the dispersion plate being constructed to reduce the size of the larger bubbles to smaller bubbles and disperse the smaller bubbles in the chilled water, the chilled water being operative to chill the wet gas and condense water vapor from the wet gas and reduce the dew point of the wet gas to yield a chilled compressed gas; and a discharge port operative to discharge the chilled compressed gas.

In a refinement, the gas-water separation system further comprises a centrifuge disposed downstream of the dispersion plate and constructed to separate the water from the wet gas.

In another refinement, the centrifuge includes a scroll-shaped flowpath constructed to separate the water from the chilled compressed gas.

In yet another refinement, the gas-water separation system further comprises an obstruction plate constructed to obstruct water and reduce an amount of the water entering the centrifuge.

In still another refinement, the gas-water separation system further comprises a coalescing filter in fluid communication with the centrifuge, wherein the coalescing filter is constructed to coalesce small water droplets into larger masses of water.

In yet still another refinement, the gas-water separation system further comprises a biological control system constructed to suppress biological activity in the tank.

In a further refinement, the biological control system includes a biocide and/or a UV light source.

Embodiments of the present invention include a method for performing water-gas separation for a compressed wet gas, comprising: filling a lower portion of a tank with water; transferring heat from the water to chill the water; introducing the wet gas into the chilled water; generating bubbles with the wet gas; dispersing the bubbles and reducing the size of the bubbles; chilling the wet gas, condensing water vapor from the wet gas and reducing the dew point of the wet gas, yielding a chilled compressed gas; and discharging the chilled compressed gas from the tank.

In a refinement, the method further comprises centrifuging water from the chilled compressed gas.

In another refinement, the method further comprises passing the chilled compressed gas through a coalescing filter to coalesce water from the centrifuged chilled compressed gas.

In yet another refinement, the method further comprises suppressing biological activity within the tank.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A gas-water separation system, comprising:
   a tank constructed to hold a quantity of water;
   a heat exchanger coupled to the tank and constructed to extract heat from the water to chill the water when the water is present within the tank;
   an inlet port constructed to inject a flow of the wet gas into the chilled water when the chilled water is present within the tank;
   a dispersion plate disposed in the tank, the tank including a volume disposed between the dispersion plate and the inlet port, the volume being sized to allow the formation of larger bubbles from the flow of the wet gas received from the inlet port, the dispersion plate being constructed to reduce the size of the larger bubbles to smaller bubbles and disperse the smaller bubbles in the chilled water, the chilled water being operative to chill the wet gas and condense water vapor from the wet gas and reduce the dew point of the wet gas to yield a chilled compressed gas;
   a centrifuge disposed in the tank downstream of the dispersion plate in relation to flow of the wet gas and constructed to separate the water from the chilled compressed gas; and
   a discharge port operative to discharge the chilled compressed gas.

2. The gas-water separation system of claim 1, further comprising an obstruction plate constructed to obstruct water and reduce an amount of the water entering the centrifuge.

3. The gas-water separation system of claim 1, further comprising a coalescing filter in fluid communication with the centrifuge, wherein the coalescing filter is constructed to coalesce small water droplets into larger masses of water.

4. The gas-water separation system of claim 1, further comprising a biological control system constructed to suppress biological activity in the tank.

5. The gas-water separation system of claim 4, wherein the biological control system includes a biocide and/or a UV light source.

6. A gas-water separation system, comprising:
   a tank constructed to hold a quantity of water;
   a heat exchanger coupled to the tank and constructed to extract heat from the water to chill the water when the water is present within the tank;
   an inlet port constructed to inject a flow of the wet gas into the chilled water when the chilled water is present within the tank;
   a dispersion plate disposed in the tank, the tank including a volume disposed between the dispersion plate and the inlet port, the volume being sized to allow the formation of larger bubbles from the flow of the wet gas received from the inlet port, the dispersion plate being constructed to reduce the size of the larger bubbles to smaller bubbles and disperse the smaller bubbles in the chilled water, the chilled water being operative to chill the wet gas and condense water vapor from the wet gas and reduce the dew point of the wet gas to yield a chilled compressed gas;
   a centrifuge disposed downstream of the dispersion plate in relation to flow of the wet gas and constructed to separate the water from the chilled compressed gas, wherein the centrifuge includes a scroll-shaped flowpath constructed to separate the water from the chilled compressed gas; and a discharge port operative to discharge the chilled compressed gas.

\* \* \* \* \*